United States Patent [19]
Schwarz

[11] Patent Number: 5,903,355
[45] Date of Patent: * May 11, 1999

[54] METHOD AND APPARATUS FOR CHECKING A PREDETERMINED MONITORING AREA

[75] Inventor: Franz Schwarz, Glottertal, Germany

[73] Assignee: Erwin Sick GmbH Optik-Elektronik, Waldkirch/Breisgau, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/414,659

[22] Filed: Mar. 30, 1995

[30] Foreign Application Priority Data

Mar. 31, 1994 [DE] Germany .............................. 44 11 448

[51] Int. Cl.⁶ .................................................... G01B 11/24
[52] U.S. Cl. ......................... 356/394; 356/376; 356/4.01; 250/221; 250/559.22
[58] Field of Search ..................................... 356/394, 372, 356/376, 384, 385, 386, 387, 4.01; 250/221, 222.1, 224, 223 R, 559.23, 559.22, 559.2

[56] References Cited

U.S. PATENT DOCUMENTS

| | | |
|---|---|---|
| 4,627,734 | 12/1986 | Rioux . |
| 4,749,273 | 6/1988 | Reinhold .................................. 356/376 |
| 4,838,696 | 6/1989 | Pryor ...................................... 356/376 |

FOREIGN PATENT DOCUMENTS

| | | |
|---|---|---|
| 2748584 | 5/1978 | Germany . |
| 2946942 | 6/1981 | Germany . |
| 3232437 | 3/1984 | Germany . |
| 3343558 | 6/1985 | Germany . |
| 0147962 | 7/1985 | Germany . |
| 3421066 | 1/1986 | Germany . |
| 3429764 | 2/1986 | Germany . |
| 3528047 | 2/1987 | Germany . |
| 3604307 | 8/1987 | Germany . |
| 3622421 | 2/1988 | Germany . |
| 370009 | 7/1988 | Germany . |
| 0290944 | 11/1988 | Germany . |
| 3832428 | 4/1989 | Germany . |
| 89 12 983 U | 3/1990 | Germany . |
| 3932844 | 4/1991 | Germany . |
| 3933437 | 4/1991 | Germany . |
| 92 08 115 U | 11/1992 | Germany . |
| 4137510 | 5/1993 | Germany . |
| 4137068 | 6/1993 | Germany . |
| 4220508 | 12/1993 | Germany . |
| 4340756 | 6/1994 | Germany . |
| WO/90/00749 | 1/1990 | WIPO . |

OTHER PUBLICATIONS

Biehl, K.E., et al. (1988) "Ultrasonic sensor systems for industrial object detection and object classification", *Technisches Messen*, vol. 55(10):367–376.

JP 60–89784 A. In: Patents Abstracts of Japan, P–390, Sep. 21, 1985, vol. 9, No. 236.

*Primary Examiner*—Hoa Q. Pham
*Attorney, Agent, or Firm*—Townsend and Townsend and Crew LLP

[57] ABSTRACT

Method for checking a predetermined monitoring area, wherein at least one distance sensor provided in particular in the edge region of the monitored area, which transmits a scanning beam which sweeps over the monitored area in a predetermined scanning movement and thereby changes its direction, which receives the scanning beam which is reflected at boundaries of the monitored area and/or at objects located in the monitored area, and which determines a distance signal representative of the distance of the point of reflection of the scanning beam from the distance sensor and also a direction signal representing the direction of the scanning beam. The distance signals and the direction signals found during the scanning movement define a distance contour function, and an evaluation unit connected to the distance sensor compares the distance contour function which has been found with at least one stored reference contour function representing an expected object contour. Moreover, the evaluation unit generates an output signal, providing the distance contour function which has been found and the reference contour function correspond, or do not correspond, within preset tolerance limits.

25 Claims, 3 Drawing Sheets

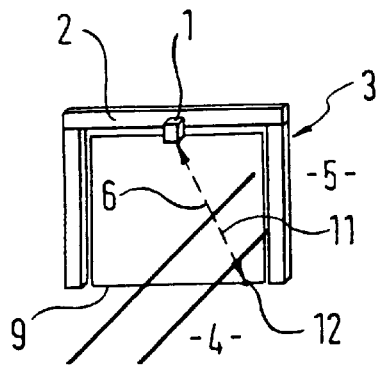
Fig. 1a1
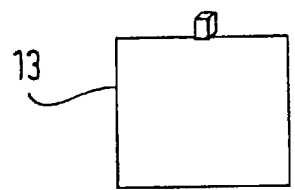
Fig. 1a2
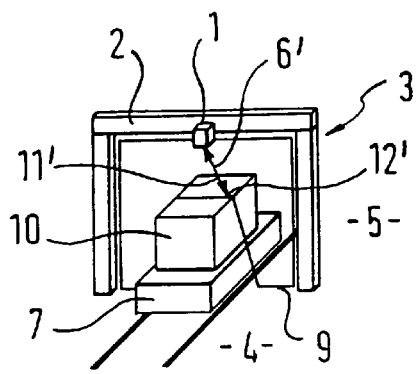
Fig. 1b1
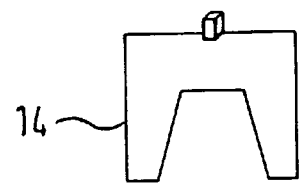
Fig. 1b2
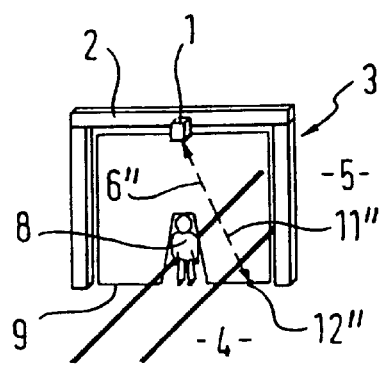
Fig. 1c1
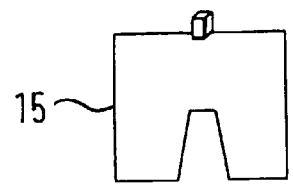
Fig. 1c2

METHOD AND APPARATUS FOR CHECKING A PREDETERMINED MONITORING AREA

BACKGROUND OF THE INVENTION

The invention relates to a method and to an apparatus for checking a predetermined monitored area.

It is for example frequently desirable in the building material industry to be able to check whether certain undesired persons or vehicles are present in a monitored area. In addition a requirement exists to be able to secure throughways or passages against the entry of persons or vehicles into dangerous regions, but with it being possible for certain persons or vehicles to pass through such throughways or passages.

It is basically known to use automatic sensor systems for such checking and security purposes. However, these mainly require a complicated installation and operate in accordance with complicated checking and evaluation processes.

SUMMARY OF THE INVENTION

It is an object of the present invention to provide a simple checking method which can be adapted without problem to the practical circumstances but which nevertheless satisfies the reliability requirements fully. Furthermore, it is an object of the invention to provide a simply constructed and universally usable checking and monitoring apparatus which reliably satisfies the security purpose expected of it.

In order to satisfy this object, provision is made that at least one distance sensor, provided in particular in the edge region of the monitored area, transmits a scanning beam which sweeps over the monitored area in a predetermined scanning movement and thereby changes its direction, receives the scanning beam which is reflected at boundaries of the monitored area and/or at objects located in the monitored area, and determines a distance signal representative of the distance of the point of reflection of the scanning beam from the distance sensor and also a direction signal representing the direction of the scanning beam, with the distance signals and the direction signals found during the scanning movement defining a distance contour function. An evaluation unit connected to the distance sensor compares the distance contour function which has been found with at least one stored reference contour function representing an expected object contour, and generates an output signal, providing the distance contour function which has been found and the reference contour function correspond, or do not correspond, in particular within preset tolerance limits.

In order to satisfy this object, the invention furthermore provides that the apparatus for checking a predetermined monitoring region has at least one distance sensor with a transmitter which transmits a scanning beam which sweeps over the monitoring area in a predetermined scanning movement and thereby changes its direction, and a receiver which receives the reflected scanning beam reflected at the boundaries of the monitored area and/or at objects located in the monitored region and determines a distance signal representing the distance of the reflection point of the scanning beam from the distance sensor and also a direction signal representative of the direction of the scanning beam, with the distance signals and the direction signals determined during the scanning movement defining a distance contour function. An evaluation unit is connected to the distance sensor and has a memory in which at least one reference contour function representative of an expected object contour is stored. The apparatus also has a comparator which compares the determined distance contour function with the stored reference contour function and generates an output signal, providing the distance contour function which has been found and the reference contour function correspond, or do not correspond, in particular within predetermined tolerance limits.

In accordance with a preferred embodiment of the invention, a safety device is connected to the evaluation unit and transmits a warning signal with a lack of correspondence of the distance contour function and the reference contour function and suppresses the transmission of a warning signal on correspondence of the distance contour function and the reference contour function. This enables a check as to whether, in addition to the expected and permissible objects in the monitoring area that are detected, other undesirable objects are also present.

When, in accordance with an alternative embodiment of the invention, the monitored area is two-dimensional, and is in particular defined by a door or by a throughway, then the scanning movement preferably takes place within a predetermined angular range in the monitored plane. In this way it is ensured that an object which enters into the two-dimensional monitored plane is detected and checked to see whether it corresponds with an expected object which is stored as a reference contour function. If correspondence or non-correspondence is determined then provision is made, in accordance with one embodiment of the invention, that this is indicated by the generation of an output signal. Further security measures can then be initiated through the appearance of an output signal, for example the transmission of a warning signal or the closing of the throughway, insofar as the objects stored as reference contour functions are impermissible objects, or, alternately, the opening of the throughway, provided the objects stored as reference contour functions are permissible objects.

In place of a gate or a doorway one can also monitor, in the context of the protection of persons, the access to a machine or plant which represents a potential danger by means of a method in accordance with the invention. When, in this case, impermissible objects are recognized the stopping or switching off of the machine or plant takes place.

Although it is basically possible that individual scanning movements are only carried out when required, it is preferred for the scanning movement to be repeated continuously and for the newly found distance contour function for each scanning movement to be continually compared with the reference contour function or functions. In this way it is ensured that after each scanning movement, a new distance contour function is available which always permits the actual presence or absence of permissible or non-permissible objects in the monitored area to be recognized.

By respectively comparing the distance contour function which is found with one of a plurality of stored reference contour functions one can ensure that the monitored area can be controlled for the presence or absence of different objects. If the monitored area is a throughway area which is to be secured, then the storage of a plurality of reference contour functions also enables the permissible entry of several different objects without the transmission of a warning signal.

It is in particular expedient if one of the stored reference contour functions represents a free monitored area. This ensures, on the one hand, that the transmission of a warning signal is also suppressed when no recognized object is present in the monitored area. On the other hand, it can also be ensured in this case that a free throughway is intentionally recognized as such, which can for example be of significance if one intends to close the throughway with a gate or the like.

The presence or absence of persons in the monitored area can be determined insofar as the stored reference contour function represents the contour of a person. This offers quite generally the advantage that persons can be distinguished from objects, for example vehicles, which can be a valuable information with certain monitoring targets, in particular when provision is made that a monitoring unit attached to the evaluation unit, on the occurrence of a specific evaluation signal, takes specific safety measures dependent on the nature of the recognized object.

The distance determination preferably takes place in accordance with the transit time method, in which the scanning beam can be generated by a laser.

In accordance with a further preferred embodiment, provision is made that the scanning beam is deflected by at least one mirror arranged near the edge or margin. In this way it can be ensured that the scanning beam, so to speak, scans the monitored area from different viewing directions so that the distance contour function which is found also represents an object contour recorded from different viewing directions. This makes it possible to distinguish between objects whose contours are the same from the viewing direction of the spacing sensor and which can only be distinguished from certain different consideration perspectives.

Errors in the determination of the measured value can be avoided if an output signal is only generated when the distance contour function which has been found repeatedly corresponds with a specific reference contour function for sequential scanning movements.

Since the distance contour function of an object which is found is dependent on the local position of the object, it can be advantageous when the evaluation unit also considers, for the comparison of a specific reference contour function with the distance contour function which has been found, those reference contour functions which result from an assumed positional translation of the object contour along the scanning movement. In this way one can avoid that a known object, i.e. an object stored as a reference contour function, is not recognized in the monitoring sequence, simply because it is located at a position at which the measured distance contour function of the object does not correspond with its stored reference contour function which is related to a different local position of the object.

The apparatus for the checking of a predetermined monitored area preferably contains one distance sensor or range sensor formed as an optical sensor.

If the monitored area is an essentially rectangular throughway then it is preferred when the distance sensor is mounted either in a corner region or centrally on the upper transverse beam of the throughway. Important for the choice of the position of the distance sensor is fundamentally the favorable consideration perspective adopted relative to the monitored area.

In a particularly preferred embodiment of the present invention the distance sensor or range sensor is the laser range finding device described in the German patent application P43 40 756.0 and the disclosure content of that application is thus part of the present application.

BRIEF DESCRIPTION OF THE DRAWINGS

FIGS. 1a, b, c are schematics forming an explanatory portrayal of the checking method of the invention and of the checking apparatus of the invention.

DESCRIPTION OF THE PREFERRED EMBODIMENTS

Figure 2:
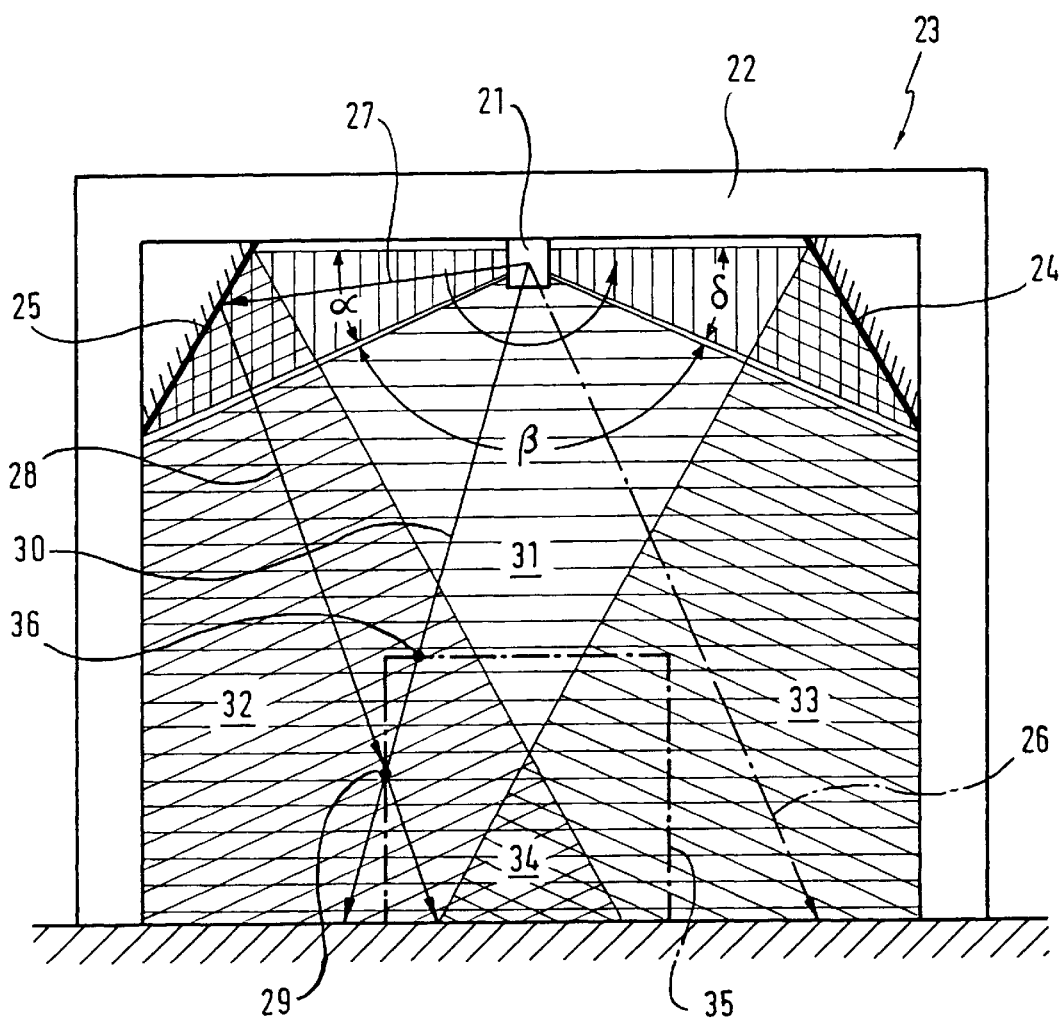
FIG. 2 is a schematic illustration of an embodiment of the checking apparatus of the invention and FIG. 3 is a schematic block circuit diagram of the checking apparatus of the invention.

In accordance with FIGS. 1a, 1b and 1c, a checking apparatus 1 in accordance with the invention is mounted centrally on an upper transverse beam 2 of a throughway 3 which separates a region 4 accessible to the public and present in front of the throughway 3 from a dangerous area 5 which lies behind the throughway. In just the same way it would be possible to mount the checking apparatus suspended from the transverse beam 2.

The throughways 3 of FIGS. 1a, 1b and 1c differ in that the throughway of FIG. 1a is free, whereas a driver-less rail vehicle 7 is present in the area of the throughway in FIG. 1b and a person 8 is present in FIG. 1c.

The method of the invention for checking the throughway 3 against unauthorized entry into the dangerous region 5 functions as follows:

In monitoring operation, the checking apparatus 1 transmits a scanning beam 6, 6', 6" which extends in the plane of the throughway and sweeps over the whole plane of the throughway with a predetermined scanning movement. The scanning beam 6, 6', 6' is reflected either at a boundary of the throughway—at the floor 9 of the throughway in FIGS. 1a and 1c—or, if appropriate, at an object located in the throughway—at the load 10 of the rail vehicle 7 in FIG. 1b —and returns to the checking device 1 as the reflected beam 11, 11', 11".

The checking apparatus determines, in a manner which will be described in the following, the spacing of the point of reflection 12, 12', 12" from the checking apparatus 1 in dependence on the actual beam direction. It thereby produces a distance contour function by scanning of the entire 180° angular range of the throughway 3 which represents the object contour found in the throughway 3 during the execution of the preset scanning movement.

The distance contour functions which have been found are respectively illustrated to the right in FIGS. 1a, 1b and 1c. They represent the distance information which was collected from the scanning beam 6, 6', 6" when sweeping over the area of the throughway. Accordingly, the distance contour function 13 shown in the right part of FIG. 1a represents a free throughway 3 whereas the distance contour functions 14 and 15 shown in FIGS. 1b and 1c represent the distance contour of the respective object 7, 10 or 8 located in the throughway 3.

For the evaluation of the distance contour functions 13, 14 and 15 which have been found there is provided an evaluation unit which is not shown in FIG. 1. In the evaluation unit distance contour functions of known admissible objects which are allowed to enter into the dangerous region 5 are stored as reference contour functions. The distance contour function 13, 14, 15 which is found, and which reflects the contour of the object 7, 10 or 8 actually present in the throughway, is now continually compared in the evaluation unit with the stored reference contour functions. If, during the comparison, a correspondence is found between the distance contour functions 13, 14 or 15, respectively, and one of the reference contour functions, then this is indicated by the transmission of a free signal. The operator of the checking apparatus thus recognizes that the object 7, 10 or 8 present in the throughway 3 is an allowed object and will permit the object 7, 10 or 8 to pass through in this case. If, in contrast, the distance contour function which has been found is not the same as any of the stored reference contour functions, then the free signal is omitted and the operator will regard the object 7, 10 or 8 which is present in the throughway 3 as an impermissible object and will thus prevent its through-passage with suitable means.

If, in place of the throughway 3, the access to a machine or plant is being monitored, then on recognizing an impermissible object the access to the machine or plant can be prevented and/or a switching off of the machine or plant can take place.

In place of the operator, a safety device can also be provided which, depending on the presence or absence of a free signal, automatically takes suitable safety measures. In this case it is particularly favorable when the distance function 13 shown in FIG. 1, which represents a free throughway, is stored as a reference function. Then the free throughway is treated in the context of the evaluation as a "free object" whereby it is ensured that a free signal is always present when either a permissible object 7, 10 or 8 is present in the throughway 3 or when the throughway 3 is free. This signifies however that the transmission of the free signal is only then suppressed when an unknown non-admissible object is located in the throughway 3. With an interruption of the free signal, suitable security measures could then be taken at once in order to prevent the non-permissible object from entering into the dangerous region.

It is equally possible that the evaluation unit only transmits a signal when no correspondence is present between the distance contour function which has been found and the stored reference contour functions. In this case the output signal does not have the character of a free signal but rather that of a warning signal. The transmission of a warning signal with a lack of correspondence between the distance contour functions of the detected objects and those of admissible objects can in particular be of great significance when the checking device is to check whether only permissible vehicles are present in a specified monitored area. If a non-admissible vehicle is present in the monitored area this is recognized and announced by the checking device. If, for example, only the distance contour functions 13 and 14 represented in FIGS. 1*a* and 1*b* are stored as reference contour functions, and if a person 8 with a distance contour function 15 in accordance with FIG. 1*c* enters into the monitored area in which only vehicles are allowed for safety reasons, then the transmission of a warning signal results whereby the person 8 is made aware of the dangerous nature of his situation. Accordingly, when monitoring the access to a dangerous machine and/or plant a switching off or stopping of the machine or plant can take place.

In addition, the checking apparatus of the invention also enables the distinguishing of different permitted objects in that a specific output signal is associated with each stored reference contour function. If, for example, the distance contour functions 14 and 15 are respectively stored as reference contour functions, then both the rail vehicle 7, 10 and also the person 8 represents an admissible object in the sense of the security method of the invention. Nevertheless, a distinction can be made between these objects 7, 10 and 8 since, on correspondence of the determined distance contour function with the reference contour function corresponding to 14, a different output signal is generated than is the case with correspondence of the determined distance contour function with the reference contour function in accordance with 15.

Furthermore, it is in principle also possible to store non-permitted objects as reference contour functions in place of permissible objects. The precondition for this is however that the object contours of the non-permitted objects are known. If, for example, the presence of vehicles of all kinds is permitted in a monitored region but the access of persons is prohibited, then the reference contour function corresponding to a distance contour function 15 can be stored as the sole reference contour function in the evaluation unit.

If then a person 8 is detected during the checking procedure, the evaluation unit notes the correspondence of the derived distance contour function with the stored reference contour function and announces this by the transmission of a suitable warning signal.

In FIG. 2 there is shown a further development of the embodiment of the invention shown in FIG. 1. In a manner similar to that illustrated in FIG. 1 the checking device 21 is mounted at the center on the upper transverse beam 22 of a throughway 23. In distinction to the embodiment of FIG. 1, suitable deflection mirrors 24 and 25 which are inclined relative to the vertical direction are however additionally provided in the corner regions of the throughway 23.

A scanning beam 26, which extends in a central angular range B with a vertical angular bisector, impinges as in FIG. 1 on a boundary of a throughway 23. In contrast, a scanning beam 27 which extends in the angular range α lying above the angular range β impinges on the deflecting mirror 25 and is reflected back from there as a deflected scanning beam 28 as shown in FIG. 2.

For the explanation of the checking method of FIG. 2, the point 29 lying on the deflected scanning beam 28 will be considered.

As can be seen from FIG. 2, the point 29 can also be reached by a direct, i.e. non-deflected, scanning beam 30 extending in the angular range β. The point 29 can thus be reached by two different light paths 27, 28 and 30 depending on the scanning beam angle of the checking device.

In general, all points which lie in the singly hatched region 31 can only be directly reached and thus by one route, whereas the points which lie in the lateral double-hatched regions 32, 33 can each be reached by two light paths and the points which lie in the triple-hatched region 34 can be reached both directly and also via both deflection mirrors 24, 25, i.e. by three different light paths.

The embodiment of the invention shown in FIG. 2 offers the advantage that a measured distance contour function obtained during a 180° sweep over the angular regions α, β and δ as a rule contains more object information than is the case with the arrangement shown in FIG. 1. If the point 29 is for example located at the sidewall of an imaginary object 35 drawn in with chain-dotted lines, then it is clear that the point 29 cannot be reached via the direct scanning beam 30 because this beam 30 would be reflected back at the point 36 on the surface of the imaginary object 35. The point 29 can however nevertheless be reached via the mirror 25 and its distance can be determined.

Analogous conditions are also present for the beam paths directed onto the deflection mirror 24 in the angular range δ.

In this way the measuring object 35 can, for example, considered from different viewing directions. This also makes it possible to determine the object contour at the side surfaces of the object 35. In this way it is ensured that objects which have a similar object contour as viewed from the angular region β can nevertheless be distinguished, providing they have a different shape at the surfaces which can be reached via the mirrors 24, 25.

In addition to the embodiment shown in FIG. 2 it is also possible to arrange deflecting mirrors in the sidewalls of the throughway 23 and furthermore provision can also be made to use spherical or cylindrical mirrors in addition to plane deflecting mirrors. The checking device 1 need not be mounted on the upper transverse beam 22 but, rather, can, for example, also be arranged in one of the corner regions or on a sidewall. Furthermore, it is possible to provide several checking devices, for example in each corner region, whereby it is likewise ensured that an object present in the monitored area can be viewed from different viewing directions.

Figure 3:
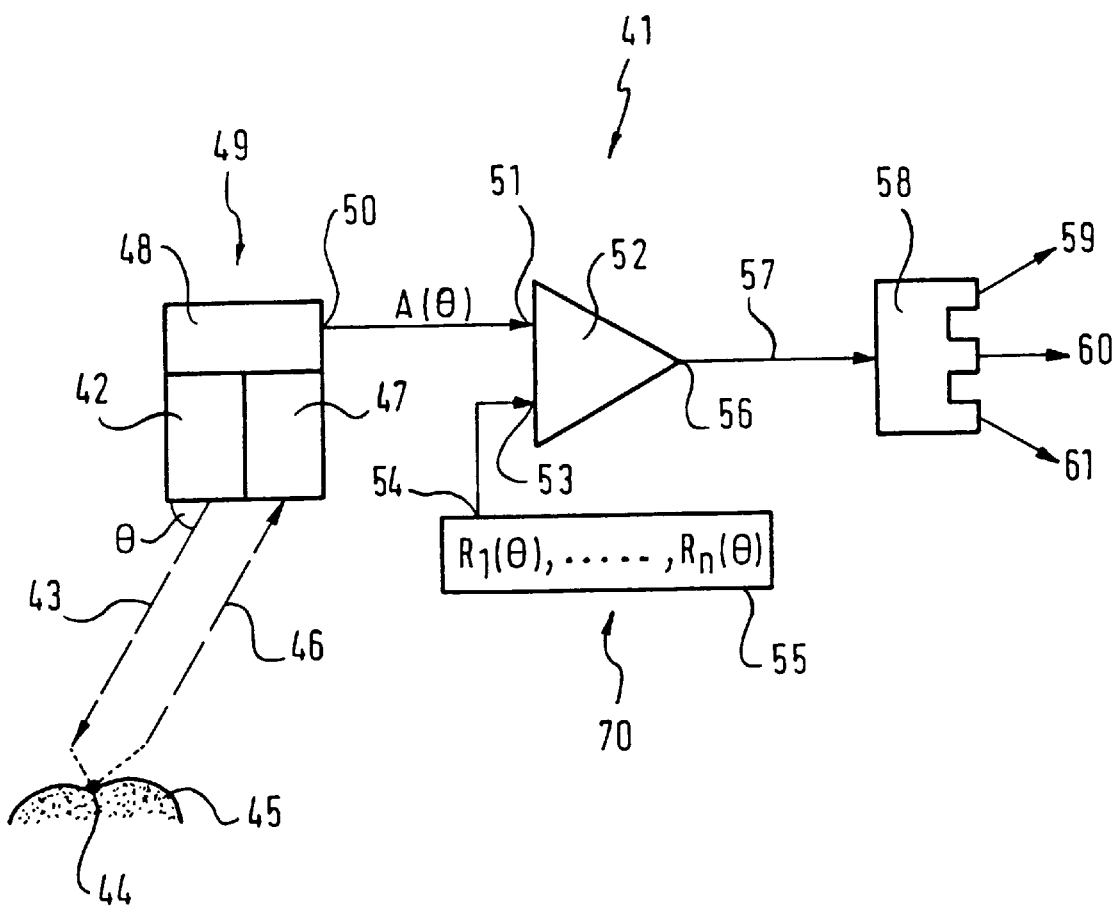

In accordance with FIG. 3, a checking device 41 in accordance with the invention comprises a transmitter 42 which transmits a scanning beam 43 into a monitored area at a predeterminable direction θ. The quantity θ represents here generally a desired spatial direction which can, for example, be given in polar coordinates. If the monitored area is a plane as in FIGS. 1 and 2, then θ is to be regarded as an angle.

The scanning beam 43 strikes an object 45 at a point 44 and is reflected from there to a receiver 47 of the checking device 41 as a reflected beam 46. The scanning beam 43 and the reflector beam 46 are in practice collinear and are simply shown parallel to and spaced apart from one another in FIG. 3 for the sake of distinguishing them better.

The transmitter 42 and the receiver 47 are connected to a control stage 48 which, on the one hand, serves to guide the scanning beam 43 along the predetermined rotating (repeating) scanning movements and which, on the other hand, is laid out, in conjunction with the transmitter 42 and receiver 47, to determine the directionally dependent distance values A (θ) of the reflection point 44 from the transmitter 42. The transmitter 42, receiver 47 and control stage 48 jointly form the distance or range finding sensor 49.

The distance or range finding sensor 49 can, for example, be the laser range finding device described in the German patent application P 43 40 756.0. In this case the transmitter 42 is formed as an optical transmitter and the receiver 47 as a photoreceiver and the determination of the distance between the reflection point 44 and the transmitter 42 takes place in accordance with the light pulse transit time method. However, other transmitters and receivers could basically be used for the distance measurement.It is solely important that the control stage 48 makes available at its output a directionally dependent distance A (θ).

The comparator 52 and the memory 55 jointly form the evaluation unit 70.

The distance signals A (θ), which are found during individual scanning movements and which respectively define a distance contour function, are supplied to one input 51 of the comparator 52. The output 54 of the memory 55 is connected to the other input 53 of the comparator 52. In the memory 55, n predetermined reference contour functions $R_1$ (θ), . . . , $R_n$(θ) are stored which respectively contain the angular dependent distance contour data of the predetermined permissible objects 1 to n.

As already mentioned in connection with FIGS. 1 and 2 an output signal 57 is, for example, precisely generated at the output 56 of the comparator 42 when the distance contour function A (θ) which is found corresponds with none of the reference contour functions $R_1$ (θ), . . . , $R_n$ (θ) present in the memory. The output signal 57 is fed to a security device 58 which makes available suitable control signals 59, 60 and 61 to subsequent devices.

The running through of the predetermined scanning movement takes place at high speed which ensures that relatively quickly moving objects 45 are also detected as being quasi stationary in the sense that distance contour functions determined in sequential scanning movements are similar to one another within the context of predetermined tolerance limits. For the suppression of faulty measurements the comparator 52 can thus be so laid out that an output signal 57 is only then generated when the distance contour functions A (θ) also do not correspond with one of the stored reference contour functions $R_1$ (θ), . . . , $R_n$ (θ) after several repetitions of the predetermined scanning movement.

Furthermore, it is possible to provide a transformation stage in a non-illustrated manner between the memory output 54 and the comparator input 53, via which not only the stored reference contour functions $R_1$ (θ), . . . , $R_n$ (θ), but rather also sets of associated transformed reference contour functions are made available to the comparator 52. If, for example, for each reference contour function $R_i$ (θ), i=1, . . . , n, which result from a transverse displacement of the contour of the reference object, those reference contour functions are generated in the transformation stage, then the control system is made insensitive to positionwise translations of the scanned object 45 along the scanning movement.

Although it is basically not necessary to accommodate the transmitter 42 and receiver 47 at one and the same location as shown in FIG. 3, and indeed preferably in a common housing, this embodiment is nevertheless preferred for reasons of the compactness of the distance sensor 49.

If several distance sensors 49 with associated memories 55 and comparators 52 are provided for the checking of the same monitored area then the outputs 56 of the different comparators 52 can be connected both via an AND logic circuit or also via an OR logic circuit to the safety device 58. In this way, complex monitoring sequences can also be checked and the redundancy of the overall system can be increased.

What is claimed is:

1. Apparatus for checking a predetermined monitoring region, wherein the apparatus has at least one distance sensor with a transmitter which transmits a scanning beam which repeatedly sweeps over the monitoring area in a predetermined scanning movement within an angular range of substantially 180 degrees and thereby changes its direction, and a receiver, arranged in a common housing with the transmitter, which receives the reflected scanning beam reflected at the boundaries of the monitored area and/or at objects located in the monitored area and determines a distance signal representing the distance of the reflection point of the scanning beam from the distance sensor and also a direction signal representative of the direction of the scanning beam, with the distance signals and the direction signals determined during the scanning movement defining a distance contour function, and wherein an evaluation unit is connected to the distance sensor and has a memory in which at least one reference contour function representative of an expected object contour is stored, and also has a comparator which compares the determined distance contour function with the stored reference contour function and generates an output signal, providing the distance contour function which has been found and the reference contour function correspond or do not correspond, within predetermined tolerance limits.

2. Apparatus in accordance with claim 1, wherein the distance sensor is formed as an optical sensor.

3. Apparatus in accordance with claim 1, wherein the distance sensor is mounted in the corner region of a throughway which is substantially rectangular.

4. Apparatus in accordance with claim 1, wherein the distance sensor is centrally mounted on the upper transverse beam of a throughway.

5. Apparatus in accordance with claim 1, wherein at least one mirror which deflects an incident scanning beam is mounted in the marginal region of the monitoring area.

6. Apparatus in accordance with claim 5, wherein the mirror or mirrors are formed as cylindrical mirrors or spherical mirrors.

7. Apparatus in accordance with claim 1, wherein the distance sensor is a laser range finding device.

8. A method for checking a predetermined monitoring area, the method comprising:

transmitting a scanning beam from at least one distance sensor;

sweeping the scanning beam in a predetermined scanning movement over the predetermined monitoring area repeatedly within an angular range of substantially 180 degrees and changing direction of the scanning beam relative to boundaries of the predetermined monitoring area or to objects located in the predetermined monitoring area while leaving the position of the at least one distance sensor unchanged;

receiving the scanning beam that is reflected from boundaries of the predetermined monitoring area or from objects located in the predetermined monitoring area;

determining, for each point of reflection of the scanning beam, a distance in accordance with the light pulse transit time method and an associated direction signal representing a direction of the scanning beam that is reflected and received;

defining a distance contour function with pairs of determined distance signals and associated direction signals, each pair representing one point of reflection of the scanning beam;

comparing a defined distance contour function with at least one stored reference contour function representing an expected object contour; and generating an output signal depending on whether the defined distance contour function and the reference contour function correspond.

9. Method in accordance with claim 8, wherein a reference contour function represents a free monitoring area.

10. Method in accordance with claim 8, wherein a reference contour function represents the contour of a person in the monitoring area.

11. Method in accordance with claim 8, wherein a reference contour function represents the contour of a vehicle in the monitoring area.

12. Method in accordance with claim 8, wherein the distance contour function is respectively compared with a plurality of stored reference contour functions.

13. Method in accordance with claim 12, wherein a specific output signal is associated with each reference contour function.

14. Method in accordance with claim 12, wherein a monitoring unit connected to the evaluation unit takes specific safety measures on the occurrence of a specific output signal and dependent on the nature of the object which is recognized.

15. Method in accordance with claim 8, wherein the scanning beam is generated by a laser.

16. Method in accordance with claim 8, wherein the output signal is first generated when the distance contour function which has been found repeatedly corresponds with sequential scanning movements to a specific reference contour function.

17. A method in accordance with claim 8 wherein the predetermined monitoring area is defined by a two-dimensional monitoring area defined by a door or a throughway.

18. A method in accordance with claim 8 further comprising transmitting a warning signal from a safety device connected to an evaluation unit if the distance contour function and the reference contour function do not correspond, and further comprising suppressing transmission of a warning signal when the distance contour function and the reference contour function correspond.

19. A method in accordance with claim 8 further comprising transmitting a warning signal with a safety device connected to an evaluation unit when the distance contour function and the reference contour function correspond, and further comprising suppressing transmission of a warning signal when the distance contour function and the reference contour function do not correspond.

20. A method in accordance with claim 8 further comprising deflecting the scanning beam by at least one reflection mirror arranged in a vicinity of an edge of the predetermined monitoring area.

21. A method in accordance with claim 8 further comprising impinging the scanning beam in a first angular range alpha on a first deflection mirror mounted in an upper corner region of a substantially rectangular throughway, and further comprising impinging the scanning beam in a second angular range gamma on a deflection mirror mounted in an opposite upper corner region of the throughway and not deflecting in an intermediate angular range beta.

22. A method in accordance with claim 21 wherein alpha equals gamma.

23. A method in accordance with claim 21 wherein alpha plus beta plus gamma equals 180 degrees.

24. A method in accordance with claim 8 further comprising considering reference contour functions that result from assumed positional translation of an object contour along the scanning movement for comparison with the distance contour signal.

25. A method for checking a predetermined monitoring area, the method comprising:

transmitting a scanning beam from one distance sensor;

sweeping the scanning beam in a predetermined scanning movement over the predetermined monitoring area repeatedly within an angular range of substantially 180 degrees and changing direction of the scanning beam relative to boundaries of the predetermined monitoring area or to objects located in the predetermined monitoring area while leaving the position of the at least one distance sensor unchanged;

receiving the scanning beam that is reflected from boundaries of the predetermined monitoring area or from objects located in the predetermined monitoring area;

determining, for each point of reflection of the scanning beam, a distance in accordance with the light pulse transit time method and an associated direction signal representing a direction of the scanning beam that is reflected and received;

defining a distance contour function with pairs of determined distance signals and associated direction signals, each pair representing one point of reflection of the scanning beam;

comparing a defined distance contour function with at least one stored reference contour function representing an expected object contour; and generating an output signal depending on whether the defined distance contour function and the reference contour function correspond.

* * * * *